US008919276B2

(12) United States Patent
Amano (10) Patent No.: US 8,919,276 B2
(45) Date of Patent: Dec. 30, 2014

(54) ASSEMBLY STRUCTURE OF DISPLAY DEVICE AND ASSEMBLY METHOD OF THE DISPLAY DEVICE

(75) Inventor: Mikiya Amano, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 276 days.

(21) Appl. No.: 13/408,235

(22) Filed: Feb. 29, 2012

(65) Prior Publication Data

US 2012/0222612 A1 Sep. 6, 2012

(30) Foreign Application Priority Data

Mar. 1, 2011 (JP) ................................ P2011-043826

(51) Int. Cl.
*G01D 11/24* (2006.01)
*B60K 37/02* (2006.01)

(52) U.S. Cl.
CPC ......... *B60K 37/02* (2013.01); *B60K 2350/1064* (2013.01); *B60K 2350/408* (2013.01); *B60K 2350/203* (2013.01)
USPC ............................ 116/305; 116/62.4; 116/284

(58) Field of Classification Search
CPC ........... G01D 7/00; G01D 7/002; G01D 7/04; G01D 11/24; G01D 13/00; B60K 35/00; B60K 37/02; B60K 2350/1064
USPC .................. 116/284, 305, 62.1, 62.4; 73/431, 73/866.1, 866.3; 296/70
See application file for complete search history.

(56) References Cited

U.S. PATENT DOCUMENTS

| 7,629,874 | B2* | 12/2009 | Araki et al. ................. 340/425.5 |
| 7,743,726 | B2 | 6/2010 | Yoshida |
| 8,640,559 | B2* | 2/2014 | Ishihara ........................ 73/866.3 |
| 2005/0109261 | A1 | 5/2005 | Tanaka et al. |
| 2006/0219155 | A1 | 10/2006 | Honma et al. |
| 2007/0279243 | A1 | 12/2007 | Araki et al. |
| 2009/0056616 | A1 | 3/2009 | Yoshida |
| 2014/0078712 | A1* | 3/2014 | Henon et al. ................ 362/23.21 |

FOREIGN PATENT DOCUMENTS

| CN | 1823260 A | 8/2006 |
| CN | 1930453 A | 3/2007 |
| CN | 101336363 A | 12/2008 |
| DE | 102007025088 A1 | 12/2007 |
| DE | 102007031645 A1 | 8/2008 |

(Continued)

OTHER PUBLICATIONS

Notification of First Office Action, issued in corresponding Chinese Application No. 201210048358.2, from The People's Republic of China, dated Feb. 20, 2014, 14 pages.

(Continued)

*Primary Examiner* — R. A. Smith
(74) *Attorney, Agent, or Firm* — Finnegan, Henderson, Farabow, Garrett & Dunner, L.L.P.

(57) ABSTRACT

An assembly structure of a display device according to the present invention is a structure in which a liquid crystal indicator is assembled to a meter body including a case having a ring-like peripheral wall, a dial arranged on a front surface side of the case, a pointer that moves on the dial, and a movement that is provided in the case and drives the pointer. In the peripheral wall of the case, an indicator insertion opening is formed, through which it is possible to insert and detach the liquid crystal indicator into and from between the movement and the dial.

6 Claims, 6 Drawing Sheets

(56) References Cited

FOREIGN PATENT DOCUMENTS

| | | | | | |
|---|---|---|---|---|---|
| JP | 63-187390 | | 11/1988 | | |
| JP | 08159818 | A * | 6/1996 | ............ | G01D 11/24 |
| JP | 10-170316 | | 6/1998 | | |
| JP | 10221123 | A * | 8/1998 | ............ | G01D 11/28 |
| JP | 2006098160 | A * | 4/2006 | ............ | G01D 11/24 |
| JP | 2008-14931 | | 1/2008 | | |
| JP | 2008-58304 | | 3/2008 | | |
| JP | 2010-181478 | | 8/2010 | | |
| JP | 2010203876 | A * | 9/2010 | ............ | G01D 11/24 |
| WO | WO 2008001605 | A1 * | 1/2008 | ............ | G01D 13/22 |
| WO | WO 2009041317 | A1 * | 4/2009 | ............ | G01D 11/24 |
| WO | WO 2011093159 | A1 * | 8/2011 | ............ | B60K 37/02 |

OTHER PUBLICATIONS

Office Action, issued from the German Patent and Trademark Office, in corresponding German Application No. 10 2012 101 574.0, dated Aug. 7, 2014, 14 pages.

Office Action, issued from the Chinese Patent and Trademark Office, in couterpart Chinese Application No. 201210048358.2, issued Sep. 11, 2014, 4 pages.

Office Action, issued from the Chinese Patent and Trademark Office, in counterpart Chinese Application No. 201210048358.2, issued Sep. 11, 2014, 3 pages.

Notification of Reasons for Refusal, issued from the Japanese Patent Office, in counterpart Japanese Application No. 2011-043826, issued Oct. 15, 2014, 4 pages.

* cited by examiner

ASSEMBLY STRUCTURE OF DISPLAY DEVICE AND ASSEMBLY METHOD OF THE DISPLAY DEVICE

BACKGROUND OF THE INVENTION

1. Field of the Invention

The present invention relates to an assembly structure of a display device and an assembly method of the display device, in which a liquid crystal indicator is assembled to a meter body including a dial, a pointer, and the like.

2. Description of the Related Art

Heretofore, in a display device mounted on a vehicle such as an automobile, there has been a technology for performing digital display using a liquid crystal indicator besides analog display using a pointer that moves on a dial attached with a speedometer and the like.

As such a conventional technology, there is known an assembly structure of a display device in which the liquid crystal indicator is assembled into a case, which houses the dial, the pointer and the like, in such a manner that a substantially thin box-like liquid crystal indicator is inserted from one end side thereof into a front surface side of the case, followed by rotational movement (JP 2010-181478 A). In such a way, attachment/detachment work for the liquid crystal indicator into/from the case can be easily performed.

SUMMARY OF THE INVENTION

Incidentally, in recent years, owing to diversified needs of the market, and the like, a display device on which the dial and the pointer and the liquid crystal indicator are mounted together has been required.

However, with regard to the conventional assembly structure of the display device, which is mentioned above, though the attachment/detachment work for the liquid crystal indicator into/from the case can be easily performed, the assembly structure concerned has only been able to cope with arranging the speedometer and the like, which are attached onto the dial, and the liquid crystal indicator individually at different places.

That is to say, in the conventional assembly structure of the display device, it has been difficult to arrange the pointer on a front surface of the liquid crystal indicator, that is, it has been difficult to arrange the liquid crystal indicator on a center side (an inside) of the speedometer and the like when viewed from front.

In this connection, it is an object of the present invention to provide an assembly structure of a display device and an assembly method of the display device, which are capable of easily assembling the liquid crystal indicator to the center side of the speedometer and the like when viewed from front, and capable of smoothly performing the attachment/detachment work for the liquid crystal indicator into/from the case.

In order to solve such problems as mentioned above, the present invention has features as below. First, an assembly structure of a display device according to a first aspect of the present invention includes: a meter body including a case with a ring-like peripheral wall, a dial arranged on a front surface side of the case, a pointer that moves on the dial, and a movement that is provided in the case and drives the pointer; and a liquid crystal indicator assembled to the meter body. In the peripheral wall, an indicator insertion opening is formed, through which it is possible to insert and detach the liquid crystal indicator into and from between the movement and the dial.

In such a way, only by inserting the liquid crystal indicator from the indicator insertion opening formed in the peripheral wall, the liquid crystal indicator can be easily assembled to a center side of a speedometer and the like when viewed from front, the speedometer and the like being to be attached onto the dial, and to between the movement and the dial. Moreover, the liquid crystal indicator can be easily attached and detached through the indicator insertion opening forming in the peripheral wall, and accordingly, attachment/detachment work for the liquid crystal indicator into/from the case can be smoothly performed.

In the assembly structure of a display device according to the first aspect of the present invention, preferably, on an opening edge portion of the indicator insertion opening, there are provided: a guide device that guides the liquid crystal indicator into the case; and a fixing device that fixes the liquid crystal indicator inserted into the case.

In such a way, the liquid crystal indicator is guided to between the movement in the case and the dial by the guide device, and accordingly, the attachment/detachment work for the liquid crystal indicator into/from the case can be smoothly performed while preventing damage to the liquid crystal indicator. Moreover, the liquid crystal indicator can be surely fixed to between the movement in the case and the dial by the fixing device, and the liquid crystal indicator can be more easily assembled into the case.

Moreover, preferably, the pointer includes a pointer body portion, a pointer detouring portion and a pointer tip end portion. In this case, preferably, one end of the pointer body portion is coupled to a rotation drive shaft of the movement, and the pointer body portion is thereby rotationally moved by drive of the movement, the pointer detouring portion is extended from the other end side of the pointer body portion, and is arranged to detour around an outer circumference of the liquid crystal indicator and the dial, and the pointer tip end portion is extended to the pointer detouring portion, and is located on the dial.

In such a way, it is possible to arrange the liquid crystal indicator between the movement and the dial, and to surely arrange the pointer on the front surface of the liquid crystal indicator.

An assembly method of a display device according to a second aspect of the present invention is an assembly method of a display device, which is for assembling a liquid crystal indicator to a meter body including a case having a ring-like peripheral wall, a dial arranged on a front surface side of the case, a pointer that moves on the dial, and a movement that is provided in the case and drives the pointer, the assembly method including: (a) the step of inserting, from an indicator insertion opening provided in the peripheral wall, an outer circumferential end of the liquid crystal indicator into the case between a pointer body portion that composes the pointer and a pointer detouring portion after one end side of the pointer body portion is assembled to the movement, the pointer detouring portion extended from the other end side of the pointer body portion (a liquid crystal indicator insertion step); (b) the step of fixing the liquid crystal indicator to the case in a state where the outer circumferential end of the liquid crystal indicator is inserted between the pointer body portion and the pointer detouring portion (a liquid crystal indicator fixing step); and (c) the step of assembling the dial to a front surface of the case so as to go around a pointer tip end portion extended from the pointer detouring portion to a front surface side of the liquid crystal indicator (a dial assembly step).

In accordance with the aspects of the present invention, there can be provided the assembly structure and the assembly method of the display device, in which, only by inserting the liquid crystal indicator from the indicator insertion opening formed in the peripheral wall, the liquid crystal indicator can be easily assembled to the center side of the speedometer and the like when viewed from front, and in addition, the attachment/detachment work for the liquid crystal indicator into/from the case can be smoothly performed.

DESCRIPTION OF THE EMBODIMENTS

A description is made of an assembly structure of a display device and an assembly method of the display device according to an embodiment of the present invention while referring to the drawings. The display device according to the embodiment is an automotive display device to be mounted on an automobile.

Note that, in the following description referring to the drawings, the same or similar reference numerals are assigned to the same or similar portions. However, the drawings are schematic, and it should be noted that ratios of the respective dimensions and the like are different from the actual ones.

Hence, specific dimensions and the like should be determined in consideration of the following description. Moreover, portions in which mutual dimensional relationships and ratios are different from one another can be included among the mutual drawings.

(1) Explanation of Assembly Structure 1 of Display Device

A description is made of an assembly structure 1 of a display device according to the embodiment while referring to the drawings.

As illustrated in FIG. 1 to FIG. 4, the assembly structure 1 of the display device is a structure in which a substantially thin box-like liquid crystal indicator 200 is assembled to a meter body 100.

Figure 2:
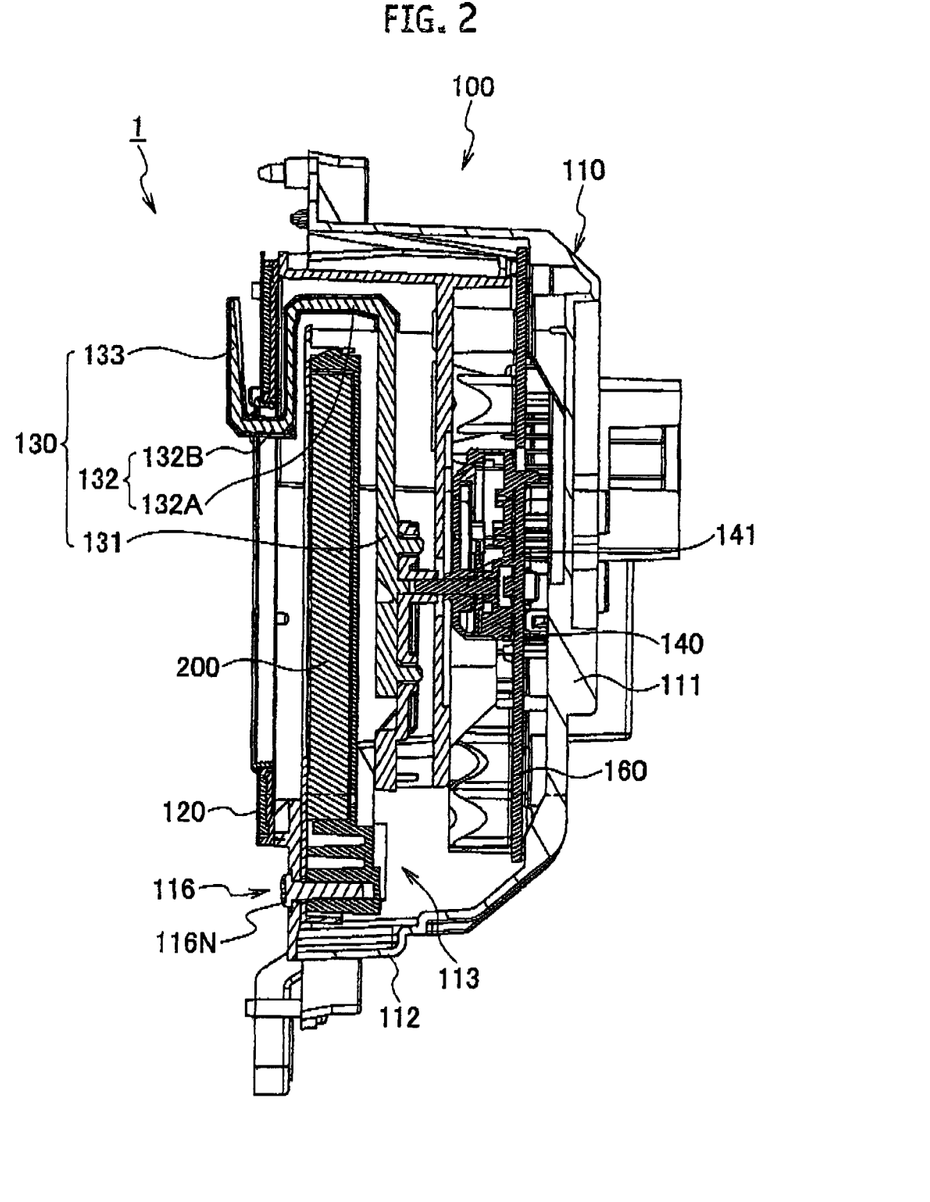
FIG. 2 is a cross-sectional view taken along a line A-A of FIG. 1.

The meter body 100 includes: a substantially box-like case 110; a dial 120 arranged on a front surface side of the case 110; a pointer 130, 130' which moves on the dial 120; and a movement 140 provided in the case 110 (refer to FIG. 2).

In the case 110, besides the dial 120, the pointer 130, and the movement 140, which are mentioned above, there are provided a variety of instruments such as a light source (not illustrated) that illuminates the dial 120 and the pointer 130 by emitting light thereto, and a combination meter wiring board 160 made of a flexible wiring board. Moreover, in the case 110, an indicator housing chamber 113 that houses the liquid crystal indicator 200 is provided (refer to FIG. 3). A detailed configuration of the case 110 will be described later.

Figure 3:
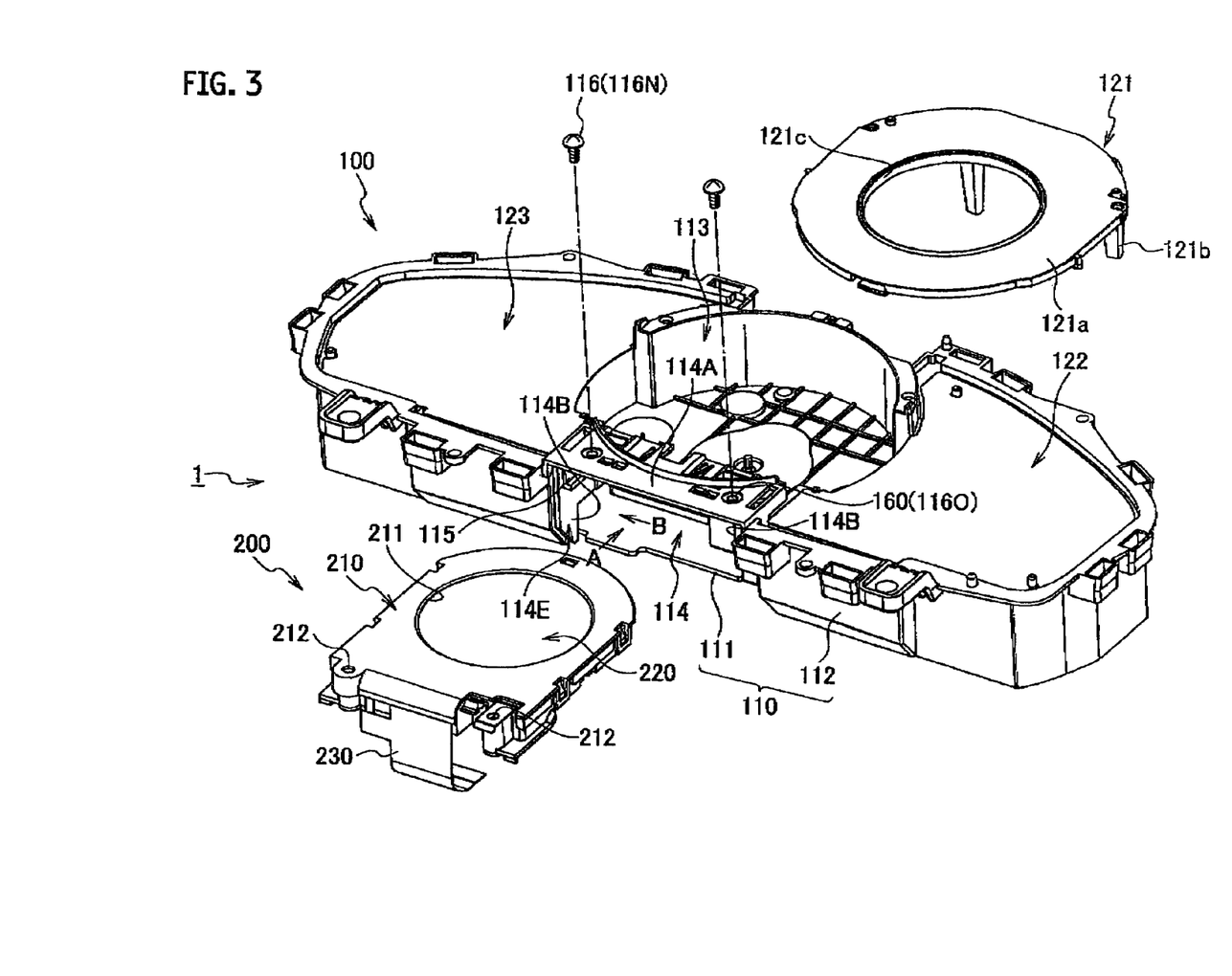
FIG. 3 is an exploded perspective view illustrating a case, a dial, and a liquid crystal indicator according to the embodiment.

The dial 120 includes: a center portion 121 located at a substantial center when viewed from front; a right side portion 122 attached with a fuel gauge 122$a$ and the like on a right side of the center portion 121; and a left side portion 123 attached with a coolant temperature gauge 123$a$ and the like on a left side of the center portion 121 (refer to FIG. 3).

Figure 1:
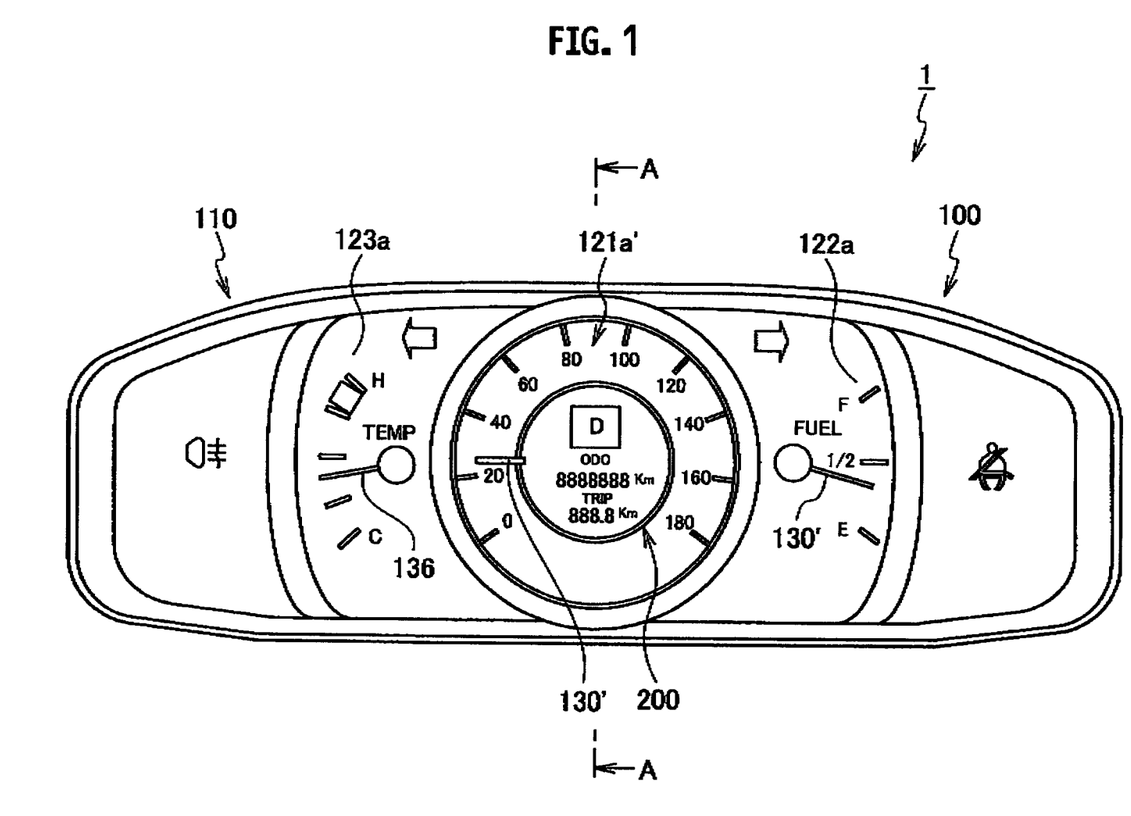
FIG. 1 is a front view illustrating an assembly structure of a display device according to an embodiment of the present invention.

The center portion 121 includes: a disc-like center plate 121$a$ attached with a speedometer 121$a$'; and light guide members 121$b$ guiding light coming from a light source (not illustrated) to the center plate 121$a$ and the pointer 130 (refer to FIGS. 1 and 3).

In the center plate 121$a$, there is formed a circular hole 121$c$ through which the liquid crystal indicator 200 is visually recognizable. The light guide members 121$b$ are erected from an outer circumferential edge of the center plate 21$a$ toward an inside of the case 110. The light guide members 121$b$ are electrically connected to the combination meter wiring board 160 and the like, whereby a lighting status of the center plate 121$a$ is controlled.

In the embodiment, the right side portion 122 and the left side portion 123 also have substantially similar configurations to that of the center portion 121, and light guide members guiding the light, which comes from the light source (not illustrated), to the dial 120 and the pointer 130, and the like are provided; however, illustration thereof is omitted in the drawings.

On the dial 120, the pointer 130 moves about the disc-like center plate 121$a$. A detailed configuration of the pointer 130 will be described later.

In the case 110, the movement 140 is provided on a back surface side of the dial 120. The movement 140 at least includes a rotation drive shaft 141 (refer to FIG. 2) that drives the pointer 130.

The liquid crystal indicator 200 digital-displays a range of transmission ("D" in FIG. 1), a variety of distances (for example, a running distance) and the like. The liquid crystal indicator 200 is housed in the indicator housing chamber 113, and is inserted into and detached from between the movement 140 and the dial 120. The liquid crystal indicator 200 includes: a liquid crystal indicator body 210; a liquid crystal indicator panel 220 fixed to the liquid crystal indicator body 210; and a flexible flat cable (FFC) 230 electrically connected to the combination meter wiring board 160 and the like on a lower side edge of the liquid crystal indicator body 210.

In the liquid crystal indicator body 210, there are formed: a window 211 open on the liquid crystal indicator panel 220; and fitting portions 212 provided on the lower side edge of the liquid crystal indicator body 210 (refer to FIG. 3). Digital-displaying of the liquid crystal indicator panel 220 is visually recognizable through the window 211. Into the fitting portions 212, screws 116N (refer to FIGS. 4 and 6) which fix the liquid crystal indicator 200 to the case 110 (the indicator housing chamber 113) are fitted.

(2) Configuration of Case 110

A detailed configuration of the case 110 is described while referring to FIGS. 3, 4, 5A, and 5B.

Figure 4:
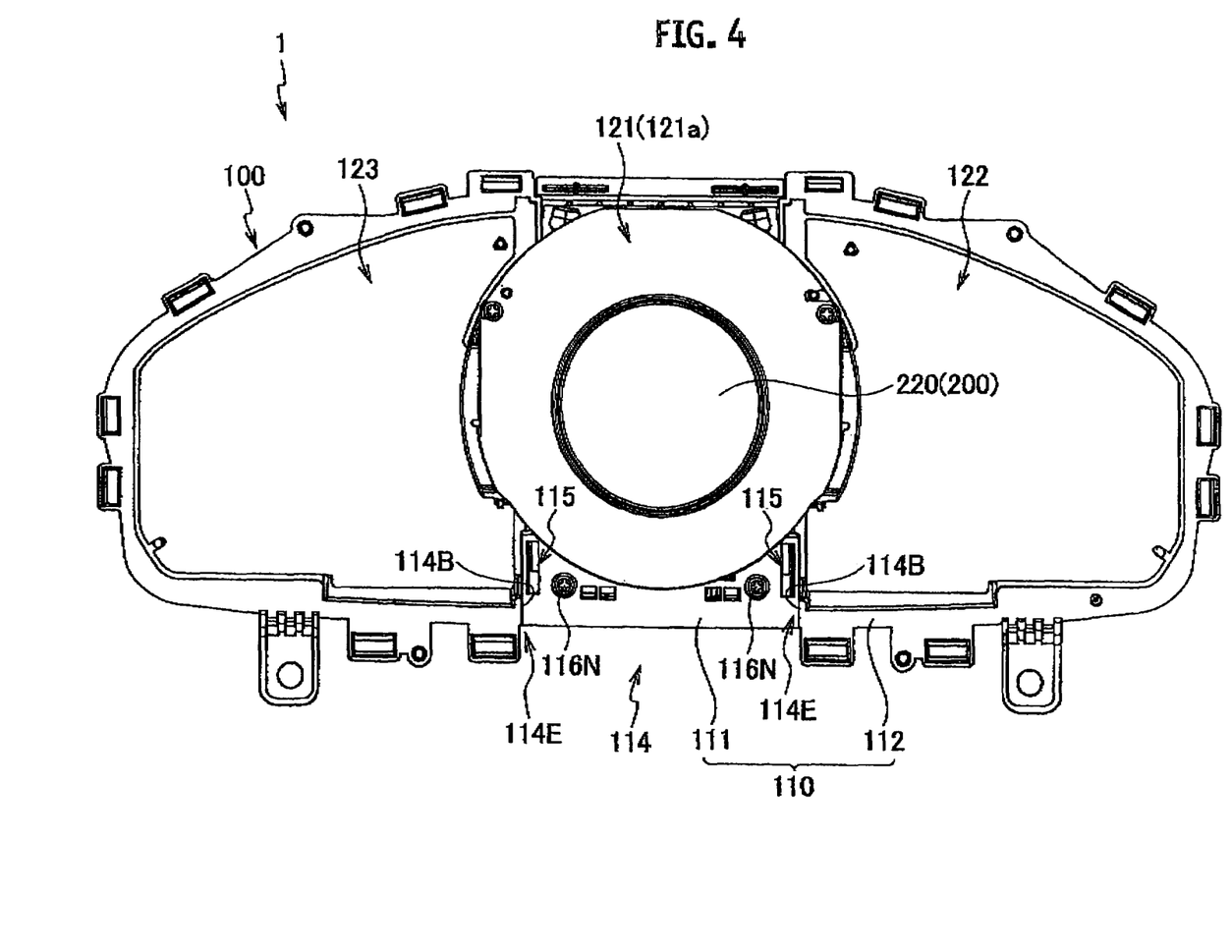
FIG. 4 is a post-assembly perspective view illustrating the case, the dial, and the liquid crystal indicator according to the embodiment.

As illustrated in FIGS. 3 and 4, the case 110 includes: a back wall 111 located on a backmost side; and a peripheral wall 112 erected from an outer circumferential edge of the back wall 111 to the dial 120 side. In the substantial center of the case 110 when viewed from front, the indicator housing chamber 113 is provided.

In the peripheral wall 112 of the case 110, an indicator insertion opening 114 is formed, through which it is possible to insert and detach the liquid crystal indicator 200 into and from between the movement 140 and the dial 120. In the embodiment, the indicator insertion opening 114 is provided on a lower surface of the peripheral wall 112.

Specifically, the indicator insertion opening 114 is formed of a front wall 114A opposite to the back wall 111; and a pair of side walls 114B located between the front wall 114A and the back wall 111.

On opening edge portions 114E of the indicator insertion opening 114, there are provided: guide devices 115 which guide an outer circumferential edge of the liquid crystal indicator 200 into the case 110; and fixing devices 116 which fix the liquid crystal indicator 200 inserted into the case 110.

Figure 5A:
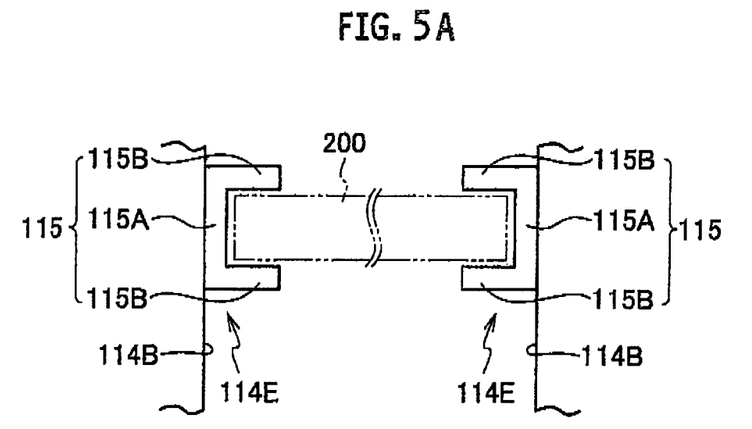
FIG. 5A is a view on arrow A of FIG. 3.
Figure 5B:
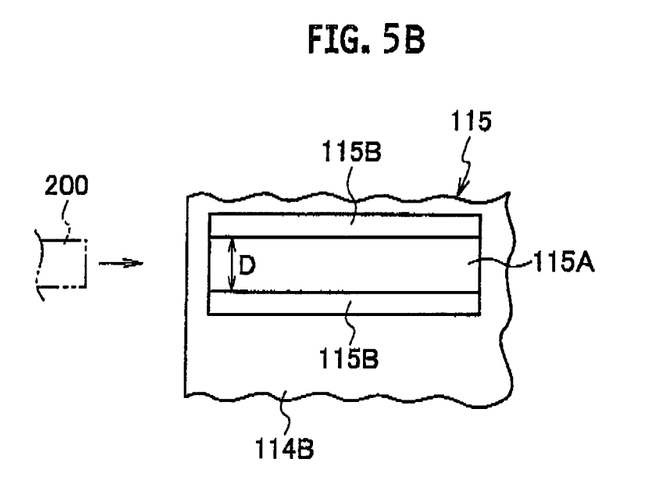
FIG. 5B is a view on arrow B of FIG. 3.

As illustrated FIGS. 4, 5A, and 5B, on the pair of side walls 114B, the guide devices 115 are formed close to the front wall 114A. The guide devices 115 guide the liquid crystal indicator 200, and in addition, also play a role of supporting the liquid crystal indicator 200, which are inserted into the case 110, so that the liquid crystal indicator 200 cannot be inclined between the movement 140 and the dial 120.

Specifically, as illustrated in FIGS. 5A and 5B, each of the guide devices 115 is formed of: a bottom portion 115A to be fixed to the side wall 114B; and a pair of protruding portions 115B which protrude from both ends of the bottom portion 115A into the indicator housing chamber 113. The pair of protruding portions 115B are formed in substantially parallel to each other in FIG. 5B; however, for the purpose of facilitating the insertion of the liquid crystal indicator 200, a portion in the vicinity of an entrance of the indicator insertion opening 114 may also be formed so that an interval D in the portion concerned can be wider than those of other portions.

The fixing devices 116 fix the liquid crystal indicator 200 between the movement 140 and the dial 120. The fixing devices 116 include: the screws 116N which fix the liquid crystal indicator 200; and holes 116O to be formed in the front wall 114A (refer to FIG. 3). That is to say, the screws 116N inserted through the holes 116O are fitted to the fitting portions 212 of the liquid crystal indicator body 210, whereby the liquid crystal indicator 200 is fixed into the case 110 (the indicator housing chamber 113).

It is not always necessary that the fixing devices 116 be the screws 116N and the holes 116O, and the fixing devices 116 just need to have a structure capable of fixing the liquid crystal indicator 200 inserted into the case 110. For example, the fixing devices 116 may have a fitting structure in which the liquid crystal indicator 200 and the front wall 114A mesh with each other.

(3) Configuration of Pointer 130

A detailed configuration of the pointer 130 is described while referring to FIG. 2.

As illustrated in FIG. 2, the pointer 130 includes: a pointer body portion 131; a pointer detouring portion 132; and a pointer tip end portion 133. One end side of the pointer body portion. 131 is coupled to the rotation drive shaft 141 of the movement 140. The pointer detouring portion 132 is extended from the other end side of the pointer body portion 131. The pointer tip end portion 133 is extended to the pointer detouring portion 132.

The pointer body portion 131 rotationally moves by drive of the movement 140. The pointer detouring portion 132 detours around an outer circumference of the liquid crystal indicator 200, and in addition, detours around the dial 120. Specifically, the pointer detouring portion 132 includes: a liquid crystal indicator detouring portion 132A that detours around the outer circumference of the liquid crystal indicator 200; and a dial detouring portion 132B that detours around the dial 120.

One end side of the liquid crystal indicator detouring portion 132A is extended to the pointer body portion 131. One end side of the dial detouring portion 132B is extended to the other end side of the liquid crystal indicator detouring portion 132A. The pointer tip end portion 133 is extended to the other end side of the dial detouring portion 132B. The dial detouring portion 132B is located on the dial 120.

(4) Explanation of Assembly Method of Display Device

Figure 6A:
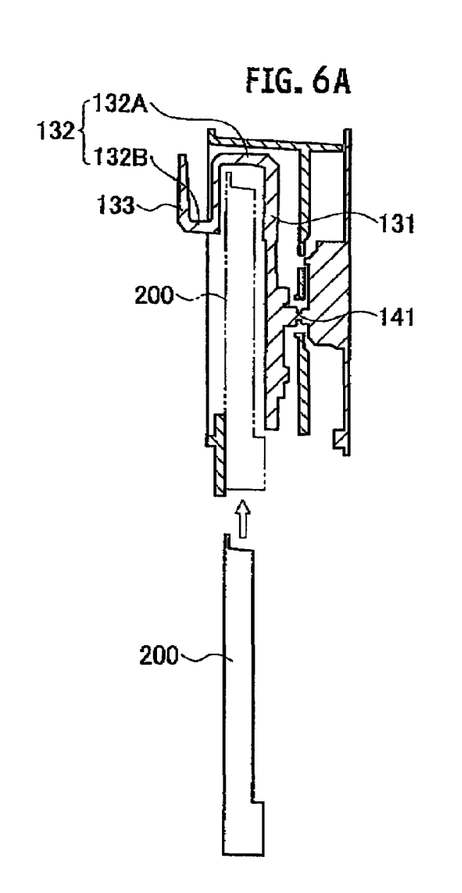
FIGS. 6A to 6C are schematic views for explaining an assembly method of the display device according to the embodiment.
Figure 6B:
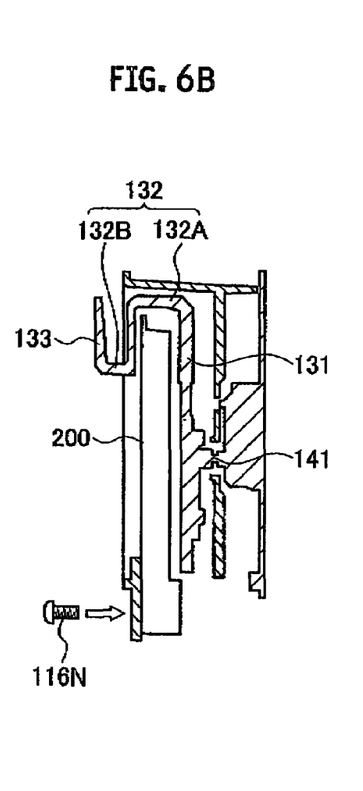
Figure 6C:
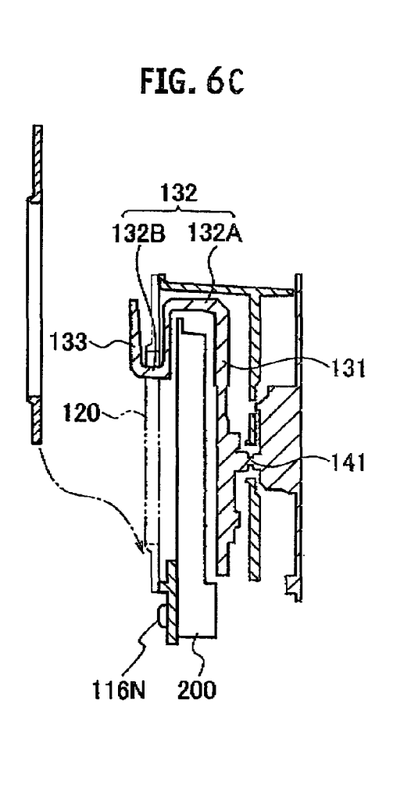

A description is made of an assembly method of the display device according to the embodiment while referring to FIGS. 6A to 6C.

As illustrated in FIGS. 6A to 6C, the assembly method of the display device is a method for assembling the thin box-like liquid crystal indicator 200 to the meter body 100. The assembly method of the display device at least includes: a liquid crystal indicator insertion step; a liquid crystal indicator fixing step; and a dial assembly step.

First, as illustrated in FIG. 6A, in the liquid crystal indicator insertion step, after the pointer 130 is coupled to the rotation drive shaft 141 of the movement 140, the liquid crystal indicator 200 is inserted into the case 110 between the pointer body portion 131 and the pointer detouring portion 132 from the indicator insertion opening 114 provided in the peripheral wall 112. In this event, the liquid crystal indicator 200 is guided into the indicator housing chamber 113 by the guide devices 115.

Next, as illustrated in FIG. 6B, in the liquid crystal indicator fixing step, the liquid crystal indicator 200 is fixed to the case 110 in such a state where the liquid crystal indicator 200 is inserted between the pointer body portion 131 and the pointer detouring portion 132. In this event, the liquid crystal indicator 200 is fixed in the indicator housing chamber 113 by the fixing devices 116.

Next, as illustrated in FIG. 6C, in the dial assembly step, the dial 120 is assembled to the front surface of the case 110 (that is, between the liquid crystal indicator 200 and the pointer tip end portion 133 extended from the pointer detouring portion 132 to a front surface side of the liquid crystal indicator 200) so as to go around the pointer tip end portion 133. In this event, for the purpose of preventing the dial 120 from contacting the liquid crystal indicator 200, it is preferable to assemble the dial 120 from the pointer tip end portion 133 side (upper side) to the front surface of the case 110.

(5) Functions and Effects

In the embodiment described above, on the peripheral wall 112 of the case 110, the indicator insertion opening 114 is formed, through which it is possible to insert and detach the liquid crystal indicator 200 into and from between the movement 140 and the dial 120. In such a way, only by inserting the liquid crystal indicator 200 from the indicator insertion opening 114, the liquid crystal indicator 200 can be easily assembled to the center side of the speedometer 121' and the like when viewed from front, the speedometer 121' and the like being to be attached onto the dial 120, and to between the movement 140 and the dial 120. Moreover, the liquid crystal indicator 200 can be easily attached and detached through the indicator insertion opening 114, and accordingly, the attachment/detachment work for the liquid crystal indicator 200 into/from the case 110 can be smoothly performed.

In the embodiment, on the opening edge portions 114E of the indicator insertion opening 114, the guide devices 115 and the fixing devices 116 are provided. By the guide devices 115, the liquid crystal indicator 200 is guided to between the movement 140 in the case 110 and the dial 120, and accordingly, the attachment/detachment work for the liquid crystal indicator 200 into/from the case 110 can be smoothly performed while preventing damage to the liquid crystal indicator 200. Moreover, by the fixing devices 116, the liquid crystal indicator 200 can be surely fixed to between the movement 140 in the case 110 and the dial 120, and the liquid crystal indicator 200 can be easily assembled into the case 110.

In the embodiment, the pointer detouring portion 132 detours around the outer circumference of the liquid crystal indicator 200, and in addition, detours around the dial 120. In such a way, it is possible to arrange the liquid crystal indicator 200 between the movement 140 and the dial 120, and to surely arrange the pointer on the front surface of the liquid crystal indicator 200.

In the assembly method of the display device according to the embodiment, the liquid crystal indicator insertion step, the liquid crystal indicator fixing step, and the dial assembly step are executed, whereby the liquid crystal indicator 200 can be easily assembled to the center side of the speedometer 121' and the like when viewed from front, the speedometer 121' and the like being to be attached onto the dial 120, and to between the movement 140 and the dial 120, and in addition, the it is possible to surely arrange the pointer on the front surface of the liquid crystal indicator 200.

In particular, in the dial assembly step, it is preferable to assemble the dial 120 from the pointer tip end portion 133 side (upper side) to the front surface of the case 110. In such a way, the dial 120 can be prevented from contacting the liquid crystal indicator 200, and accordingly, the damage to the liquid crystal indicator 200 can be surely prevented.

(6) Other Embodiments

As mentioned above, the contents of the present invention have been disclosed through the embodiment of the present invention; however, it should not be understood that the description and the drawings, which form a part of this disclosure, limit the present invention. From this disclosure, a variety of alternative embodiments, examples and operation technologies will be obvious for persons skilled in the art.

For example, the embodiment of the present invention can be modified as follows. The assembly structure 1 of the display device has been described to be mounted on the automobile; however, is not limited to this, and may be used for a display instrument of a motorcycle, a vessel, and the like.

The liquid crystal indicator 200 has been described to be provided on the center portion 121 of the dial 120; however, is not limited to this, and may be provided on the right side portion 122 or the left side portion 123. That is to say, it is not always necessary that the liquid crystal indicator 200 be assembled to the center side of the speedometer 121' when viewed from front, the speedometer 121' being to be attached to the dial 120, and the liquid crystal indicator 200 may be assembled to a center side of the fuel gauge 122a or the coolant temperature gauge 123a when viewed from front.

The indicator insertion opening 114 has been described to be provided on the lower surface in the peripheral wall 112; however, is not limited to this, and may be provided on an upper surface and a side surface in the peripheral wall 112.

The guide devices 115 have been described to guide the outer circumferential edge of the liquid crystal indicator 200; however, are not limited to this, and for example, in the case where guide protrusions are provided on the outer circumferential edge of the liquid crystal indicator 200, the guide devices may have a structure to guide the guide protrusions concerned.

As described above, it is a matter of course that the present invention incorporates a variety of embodiments and the like, which are not described herein. Hence, the technical scope of the present invention is determined only by the invention specifying items according to the scope of claims reasonable from the above description.

What is claimed is:

1. An assembly structure of a display device, comprising:
    a meter body including a case having a ring-like peripheral wall, a dial arranged on a front surface side of the case, a pointer that moves on the dial, and a movement that is provided in the case and drives the pointer;
    a liquid crystal indicator assembled to the meter body; and
    a fixing device; wherein:
    in the peripheral wall, an indicator insertion opening is formed, through which it is possible to insert and detach the liquid crystal indicator into and from between the movement and the dial;
    the indicator insertion opening includes a pair of sidewalls, each sidewall being provided with a guide device formed of a bottom portion and a pair of protruding portions protruding from both ends of the bottom portion into the case;
    each protruding portion of the pair of protruding portions are substantially parallel to each other;
    the guide device guides the liquid crystal indicator into the case; and
    the fixing device fixes the liquid crystal indicator inserted into the case.

2. The assembly structure of a display device according to claim 1, wherein
    the pointer includes a pointer body portion, a pointer detouring portion, and a pointer tip end portion,
    one end of the pointer body portion is coupled to a rotation drive shaft of the movement, and the pointer body portion is thereby rotationally moved by drive of the movement,
    the pointer detouring portion is extended from the other end side of the pointer body portion, and is arranged to detour around an outer circumference of the liquid crystal indicator and the dial, and
    the pointer tip end portion is extended to the pointer detouring portion, and is located on the dial.

3. The assembly structure of a display device according to claim 1, wherein,
    the case comprises a back wall, the peripheral wall erected from an outer circumferential edge of the back wall, and
    the indicator insertion opening comprises a part of the back wall, a front wall opposite to the back wall, and a pair of side walls located between the front wall and the back wall.

4. The assembly structure of a display device according to claim 3, wherein,
    the front wall is provided with a window which is capable to visually recognize a part of the guide device.

5. The assembly structure of a display device according to claim 3, wherein,
    each of the side walls is higher than the peripheral wall, and protrudes from the peripheral wall to a direction where the liquid crystal indicator is to be inserted.

6. An assembly method of a display device, which is for assembling a liquid crystal indicator to a meter body including a case having a ring-like peripheral wall, a dial arranged on a front surface side of the case, a pointer that moves on the dial, and a movement that is provided in the case and drives the pointer, the assembly method comprising:

inserting, from an indicator insertion opening provided in the peripheral wall, an outer circumferential end of the liquid crystal indicator into the case between a pointer body portion that composes the pointer and a pointer detouring portion after one end side of the pointer body portion is assembled to the movement, the pointer detouring portion extended from the other end side of the pointer body portion;

fixing the liquid crystal indicator to the case in a state where the outer circumferential end of the liquid crystal indicator is inserted between the pointer body portion and the pointer detouring portion; and     assembling the dial to a front surface of the case so as to go around a pointer tip end portion extended from the pointer detouring portion to a front surface side of the liquid crystal indicator;

wherein the indicator insertion opening includes a pair of sidewalls, each sidewall being provided with a guide device formed of a bottom portion and a pair of protruding portions protruding from both ends of the bottom portion into the case;

wherein each protruding portion of the pair of protruding portions are substantially parallel to each other; and     wherein the guide device guides the liquid crystal indicator into the case.

\* \* \* \* \*